US011560525B2

(12) United States Patent
Kouva et al.

(10) Patent No.: US 11,560,525 B2
(45) Date of Patent: Jan. 24, 2023

(54) DIESEL FUEL COMPOSITION

(71) Applicant: Neste Oyj, Espoo (FI)

(72) Inventors: Merja Kouva, Porvoo (FI); Kalle Lehto, Porvoo (FI); Markku Kuronen, Porvoo (FI); Marja Tiitta, Porvoo (FI); Ulla Kiiski, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 17/312,183

(22) PCT Filed: Nov. 25, 2019

(86) PCT No.: PCT/FI2019/050837
§ 371 (c)(1),
(2) Date: Jun. 9, 2021

(87) PCT Pub. No.: WO2020/120834
PCT Pub. Date: Jun. 18, 2020

(65) Prior Publication Data
US 2022/0049174 A1    Feb. 17, 2022

(30) Foreign Application Priority Data

Dec. 14, 2018 (FI) .................................. 20186076

(51) Int. Cl.
*C10L 10/02* (2006.01)
*C10G 45/58* (2006.01)
(Continued)

(52) U.S. Cl.
CPC ........ *C10L 1/185* (2013.01); *C10L 2200/0446* (2013.01); *C10L 2270/026* (2013.01)

(58) Field of Classification Search
CPC ........ C10G 2300/1011; C10G 2400/04; C10G 3/47; C10G 3/50; C10G 45/58;
(Continued)

(56) References Cited

U.S. PATENT DOCUMENTS 5,308,365 A * 5/1994 Kesling, Jr. ............. C10L 10/12
44/449
6,015,440 A   1/2000 Noureddini
(Continued)

FOREIGN PATENT DOCUMENTS

CN        1688673 A   10/2005
CN      101233212 A    7/2008
(Continued)

OTHER PUBLICATIONS

Schemme Steffen et al.: "Power-to-fuel as a key to sustainable transport systems—An analysis of diesel fuels produced from 002 and renewable electricity", Fuel, IPC Science and Technology Press, Guildford, GB, vol. 205, Jun. 1, 2017 (Jun. 1, 2017), pp. 198-221 (Year: 2017).*

(Continued)

*Primary Examiner* — Ellen M McAvoy
*Assistant Examiner* — Chantel L Graham
(74) *Attorney, Agent, or Firm* — Buchanan Ingersoll & Rooney PC (57) ABSTRACT

A diesel fuel composition containing a renewable diesel component and oxymethylene ethers having molecular structure CH3O—(CH2O)n-CH3 with n=3-5 (OME3-5). A method for producing a diesel fuel composition and use thereof. Use of OME3-5 to decrease particle emission of renewable diesel fuels is further disclosed.

20 Claims, 3 Drawing Sheets

(51) Int. Cl.
    *C10L 1/185*     (2006.01)
    *C10L 1/08*     (2006.01)

(58) Field of Classification Search
CPC .. C10L 10/02; C10L 1/026; C10L 1/08; C10L 1/185; C10L 2200/0446; C10L 2270/026; Y02E 50/10; Y02P 30/20
See application file for complete search history.

(56) References Cited

U.S. PATENT DOCUMENTS

| | | | |
|---|---|---|---|
| 9,447,339 | B2 | 9/2016 | Novak et al. |
| 10,000,712 | B2 | 6/2018 | Novak et al. |
| 2004/0230085 | A1 | 11/2004 | Jakkula et al. |
| 2006/0207166 | A1 | 9/2006 | Herskowitz et al. |
| 2007/0006523 | A1 | 1/2007 | Myllyoja et al. |
| 2008/0207955 | A1 | 8/2008 | Fer et al. |
| 2008/0216390 | A1 | 9/2008 | Tebben et al. |
| 2011/0105812 | A1 | 5/2011 | Marker et al. |
| 2011/0203253 | A1 | 8/2011 | Derr et al. |
| 2011/0219672 | A1 | 9/2011 | Novak et al. |
| 2011/0239532 | A1 | 10/2011 | Baldiraghi et al. |
| 2014/0114092 | A1 | 4/2014 | Xia et al. |
| 2015/0068109 | A1 | 3/2015 | Baldiraghi et al. |
| 2017/0037331 | A1 | 2/2017 | Novak et al. |
| 2022/0017831 | A1 | 1/2022 | Kiiski et al. |

FOREIGN PATENT DOCUMENTS

| | | | | |
|---|---|---|---|---|
| CN | 102216427 | A | 10/2011 | |
| CN | 106103397 | A | 11/2016 | |
| CN | 107011935 | A | 8/2017 | |
| CN | 108250053 | A | 7/2018 | |
| CN | 108503514 | A | 9/2018 | |
| EP | 1795576 | A1 | 6/2007 | |
| EP | 2987781 | A1 | 2/2016 | |
| FR | 2940314 | A1 | 6/2010 | |
| FR | 2940314 | A1 * | 6/2010 | ............. C10L 1/026 |
| WO | 2004022674 | A1 | 3/2004 | |
| WO | 2007061903 | A1 | 5/2007 | |
| WO | 2008113492 | A1 | 9/2008 | |
| WO | 2009066925 | A2 | 5/2009 | |
| WO | 2010077476 | A2 | 7/2010 | |
| WO | 2013038029 | A1 | 3/2013 | |
| WO | 2015140714 | A1 | 9/2015 | |
| WO | 2018037163 | A1 | 3/2018 | |
| WO | 2018115575 | A1 | 6/2018 | |

OTHER PUBLICATIONS

FR2940314A1—Translation (Year: 2010).*
Adetoyese, O. Oyedun, et al., "The development of the production cost of oxymethelene ethers as diesel additives from biomass", Biofuels, Bioproducts & Biorefining, vol. 12, No. 4, May 2, 2018, pp. 694-710. (18 pages).
Björn, Lumpp, et al., "Oxymethylene Ethers as Diesel Fuel Additives of the Future", MTZ Worldwide, vol. 72, No. 3, Mar. 1, 2011, pp. 34-38. (5 pages).
Burger, J., et al., "Poly(oxymethylene) dimethyl ethers as components of tailored diesel fuel Properties, synthesis and purification concepts", Fuel, IPC Science and Technology Press, Guildford, GB, vol. 89, No. 11, Nov. 1, 2010, pp. 3315-3319. (5 pages).
Copyright Notice issued by the Finnish Patent and Registration Office, Finnish Application No. 20186076, filing date Dec. 14, 2018, Applicant Neste Oyj. (1 page).
Di Blasio, G., et al., "Experimental Characterization of Diesel Combustion Using Glycerol Derived Ethers Mixtures", SAE Int. J Fuels Lur, Aug. 9, 2013, pp. 940-950, vol. 6, No. 3, doi:10.4271/2013-24-0104, SAE International. (11 pages).
Diesel Fuel, Wikipedia, online retrieved Mar. 25, 2019, https://en.wikipedia.org/w/index.php?title=Diesel_fuel&oldid=872190564, whole document. (5 pages).
Dijs, Ivo J., et al., "Quantitative Determination by 14C Analysis of the Biological Component in Fuels," Radiocarbon, 2006, pp. 315-323, vol. 48, No. 3, Arizona Board of Regents on behalf of the University of Arizona, US. (9 pages).
Finnish Office Action dated Mar. 27, 2019 issued by the Finnish Patent and Registration Office in Finnish Application No. 20186076. (5 pages).
Finnish Office Action dated Mar. 27, 2019 issued by the Finnish Patent and Registration Office in Finnish Application No. 20186078. (6 pages).
Finnish Search Report dated Mar. 27, 2019 issued by the Finnish Patent and Registration Office in Finnish Application No. 20186076. (2 pages).
Finnish Search Report dated Mar. 27, 2019 issued by the Finnish Patent and Registration Office in Finnish Application No. 20/186,078. (2 pages).
Härtl, Martin, et al., "Oxygenate screening on a heavy-duty diesel engine and emission characteristics of highly oxygenated oxymethylene ether fuel OME1", Fuel, vol. 153, 2015, pp. 328-335, Elsevier Ltd. (8 pages).
Härtl, Martin, et al., "Oxymethylene Ether as Potentially C02-neutral Fuel for Clen Diesel Engines Part 1: Engine Testing", MTZ worldwide, Feb. 1, 2017, pp. 52-59. (8 pages).
Huang, H., et al., "Effects of EGR rates on combustion and emission characteristics in a diesel engine with n-butanol/PODE3-4/diesel blends. In: Applied Thermal Engineering", Sep. 28, 2018, vol. 146, pp. 212-222. (11 pages).
International Preliminary Report on Patentability (PCT/IPEA/409) issued in corresponding International Patent Application No. PCT/FI2019/050814 dated Nov. 6, 2020. (14 pages).
International Preliminary Report on Patentability (PCT/IPEA/409) issued in corresponding International Patent Application No. PCT/FI2019/050837 dated Dec. 18, 2020. (11 pages).
International Search Report (PCT/ISA/210) and Written Opinion (PCT/ISA/237) dated Feb. 10, 2020, by the European Patent Office as the International Searching Authority for International Application No. PCT/FI2019/050814. (13 pages).
International Search Report (PCT/ISA/210) and Written Opinion (PCT/ISA/237) dated Feb. 25, 2020, by the European Patent Office as the International Searching Authority for International Application No. PCT/FI2019/050837. (17 pages).
Jacob et al., "Oxymethylenether als potenziell CO2-Neutraler Kraftstoff fursaubere Dieselmotoren, Teil 2: Erfüllung des Nachhaltigkeitsanspruchs", Mar. 2017, pp. 54-61. (8 pages).
Jaecker-Voirol, A., et al., "Glycerin for New Biodiesel Formulation," Oil & Gas Science and Technology, Jul. 1, 2008, pp. 395-404, vol. 63, No. 4, DOI: 10.2516/ogst:2008033, Institut français du pélrole, FR. (10 pages).
Lovestead, T.M., et al., "Comparison of Diesel Fuel Oxygenate Additives to the Composition-Explicit Distillation Curve Method. Part3:t-Butyl Glycerols", Energy & Fuels, May 2, 2011, pp. 2518-2525, vol. 25, dx.doi.org/10.1021/ef200343a, ACS Publ, Amer Chem Society, US. (8 pages).
Oestreich, D., et al., "Production of oxymethylene dimethyl ether (OME)-hydrocarbon fuel blends in a one-step synthesis/extraction procedure. In: Fuel", Nov. 4, 2017, vol. 214, pp. 39-44. (6 pages).
Schemme, Steffen, et al., "Power-to-fuel as a key to sustainable transport systems—An analysis of diesel fuels produced from C01and renewable electricitty", Fuel, IPC Science and Technology Press, Guildford, GB, vol. 205, Jun. 1, 2017, pp. 198-221. (24 pages).
Office Action dated Dec. 24, 2021, by the U.S. Patent and Trademark Office in U.S. Appl. No. 17/312,344.
First Office Action dated Jun. 22, 2022, by the Chinese Patent Office in corresponding Chinese Patent Application No. 201980081113.X, and an English Translation of the Office Action. (15 pages).
Office Action (Communication) dated Apr. 5, 2022, by the European Patent Office in corresponding European Patent Application No. 19 816 815.5. (7 pages).
Office Action dated Apr. 1, 2022, by the U.S. Patent and Trademark Office in U.S. Appl. No. 17/312,344.

(56) References Cited

OTHER PUBLICATIONS

Office Action (First Examination Letter of Opinion) dated May 24, 2022, by the Chinese Patent Office in corresponding Chinese Patent Application No. 201980081710.2, and an English Translation of the Office Action. (8 pages).

* cited by examiner

DIESEL FUEL COMPOSITION

TECHNICAL FIELD

The present invention generally relates to a diesel fuel composition. The invention relates particularly, though not exclusively, to a diesel fuel composition comprising a renewable diesel component and oxymethylene ethers, the diesel fuel composition providing benefits with particulate emissions.

BACKGROUND ART

This section illustrates useful background information without admission of any technique described herein representative of the state of the art.

Environmental considerations have in recent years impacted the fuel industry. For example, efforts have been made to decrease emissions of vehicle fuels and to replace fuels of fossil origin with more environmentally sustainable renewable fuels and fuel blending components.

Particulate emissions from vehicle engines deteriorate local air quality, cause environmental damage and are a potential cause for health problems. For example, small particulates from automotive engine emissions may be carried deep into lungs or even into blood steam. Further, high particulate emissions increase the load on particulate filters in vehicle exhaust after treatment systems, which shortens the regeneration interval of the particulate filters.

SUMMARY

According to a first aspect of the invention there is provided a diesel fuel composition comprising:
  a. a renewable paraffinic diesel component 20-95 vol-% of the total diesel fuel composition volume; and
  b. oxymethylene ethers having molecular structure $CH_3O-(CH_2O)_n-CH_3$, with n=3-5 (OME3-5), 5-80 vol-% of the total diesel fuel composition volume.

It has been found that diesel fuel compositions according to the first aspect have beneficial particulate emission properties.

In certain embodiments, the diesel fuel composition comprises 20-90 vol-% renewable paraffinic diesel component and 10-80 vol-% OME3-5 of the total diesel fuel composition volume. Diesel fuel compositions comprising at least 10 vol-% OME3-5 have particularly beneficial particulate emission properties.

In certain embodiments, the diesel fuel composition comprises 10-20 vol-%, preferably 12-20 vol-%, further preferably 13-20 vol-%, and more preferably 15-20 vol-% OME3-5 of the total diesel fuel composition volume. Such diesel fuel compositions have particularly beneficial particulate emission properties and a density meeting density requirements of standard EN 590:2017 for automotive diesel fuel, particularly of EN 590:2017 Class 0 to Class 2 fuels.

In certain embodiments, the diesel fuel composition comprises 16-20 vol-%, preferably 17-20 vol-%, further preferably 18-20 vol-%, and more preferably 19-20 vol-% OME3-5 of the total diesel fuel composition volume. Such diesel fuel compositions have very beneficial particulate emission properties and meet density requirements of EN 590:2017.

In certain embodiments, the diesel fuel composition comprises renewable paraffinic diesel component 80-90 vol-%, preferably 80-88 vol-%, further preferably 80-87 vol-%, and more preferably 80-85 vol-% of the total diesel fuel composition volume. Diesel fuel compositions according to these embodiments have beneficial particulate emission properties and a density meeting density requirements of standard EN 590:2017.

In certain embodiments, the combined amount of a. and b. in the diesel fuel composition is at least 95 vol-%, preferably at least 97 vol-%, more preferably at least 99 vol-% of the total diesel fuel composition volume. Diesel fuel compositions comprising mainly renewable paraffinic diesel component and OME3-5 perform well as automotive diesel fuels and have particularly beneficial particulate emission properties.

In certain embodiments, the renewable paraffinic diesel component comprises paraffins at least 90 wt-%, preferably at least 95 wt-%, and more preferably at least 99 wt-% of the total weight of the renewable paraffinic diesel component. A high paraffin content of the renewable paraffinic diesel component favors beneficial particulate emission properties.

In certain embodiments, the renewable paraffinic diesel component comprises paraffins in the range of carbon number C15-C18 at least 70 wt-%, more preferably at least 80 wt-%, most preferably at least 90 wt-% of the total weight of paraffins in the renewable paraffinic diesel component.

In certain embodiments, the renewable paraffinic diesel component comprises i-paraffins and n-paraffins in a weight ratio of i-paraffins to n-paraffins of at least 2.2, at least 2.3, at least 3 or at least 4. Renewable paraffinic diesel components comprising i-paraffins and n-paraffins in a weight ratio of i-paraffins to n-paraffins of at least 2.2 provide the diesel fuel composition with beneficial cold properties.

In certain embodiments, the OME3-5 comprises 40-50 wt-%, preferably 45 wt-%, OME3 ($CH_3O-(CH_2O)_n-CH_3$ with n=3), 35-45 wt-%, preferably 40 wt-%, OME4 ($CH_3O-(CH_2O)_n-CH_3$ with n=4), and 5-25 wt-%, preferably 15 wt-%, OME5 ($CH_3O-(CH_2O)_n-CH_3$ with n=5) of the total weight of OME3-5 in the diesel fuel composition. Such distributions of OME3, OME4, and OME5 in the OME3-5 favors beneficial particulate emission properties.

According to a second aspect of the invention there is provided a method for producing a diesel fuel composition, comprising:
providing a renewable paraffinic diesel component;
providing oxymethylene ethers having molecular structure $CH_3O-(CH_2O)_n-CH_3$, with n=3-5 (OME3-5); and
mixing the renewable paraffinic diesel component with the OME3-5 to form a diesel fuel composition comprising, based on the total diesel fuel composition volume, 5-80 vol-% OME3-5, and 20-95 vol-% renewable paraffinic diesel component. Diesel fuel compositions manufactured according to the method of the second aspect have beneficial particulate emission properties.

In certain embodiments, the method comprises mixing the renewable paraffinic diesel component with the OME3-5 to form a diesel fuel composition comprising, based on the total diesel fuel composition, 20-90 vol-% renewable paraffinic diesel component and 10-80 vol-% OME3-5.

In certain embodiments, the method comprises mixing the renewable paraffinic diesel component with the OME3-5 to form a diesel fuel composition comprising, based on the total diesel fuel composition, OME3-5 10-20 vol-%, preferably 12-20 vol-%, further preferably 13-20 vol-%, and more preferably 15-20 vol-% of the total diesel fuel composition volume. Diesel fuel compositions formed according to these embodiments have particularly beneficial particulate emission properties and a density meeting density requirements of EN 590:2017, particularly of EN 590:2017 Class 0 to Class 2 fuels.

In certain embodiments, the method comprises mixing the renewable paraffinic diesel component with the OME3-5 to form a diesel fuel composition comprising 16-20 vol-% OME3-5, preferably 17-20 vol-% OME3-5, further preferably 18-20 vol-% OME3-5, and more preferably 19-20 vol-% OME3-5 of the total diesel fuel composition volume. Diesel fuel compositions produced according to these embodiments have very beneficial particulate emission properties and a density meeting density requirements of EN 590:2017.

In certain embodiments, the method comprises mixing the renewable paraffinic diesel component with the OME3-5 to form a diesel fuel composition comprising renewable paraffinic diesel component 80-90 vol-%, preferably 80-88 vol-%, further preferably 80-87 vol-%, and more preferably 80-85 vol-% of the total diesel fuel composition volume. Diesel fuel compositions manufactured according to these embodiments have beneficial particulate emission properties and a density meeting density requirements of standard EN 590:2017.

In certain embodiments, providing a renewable paraffinic diesel component comprises:
i. providing a renewable feedstock comprising fatty acids, or triglycerides, or both;
ii. subjecting the renewable feedstock to a hydrotreatment, preferably hydrodeoxygenation, to produce n-paraffins; and optionally
iii. subjecting at least a portion of the n-paraffins from step ii) to an isomerization treatment to produce i-paraffins.

Renewable paraffinic diesel components provided through hydrotreatment and optional isomerization contribute to the beneficial particulate emission properties of the formed diesel fuel composition.

In certain embodiments, providing OME3-5 comprises:
I. providing methanol originating from renewable sources;
II. converting a portion of said methanol to formaldehyde and another portion of said methanol to trioxane;
III. reacting the unconverted methanol with formaldehyde obtained in step II to form oxymethylene ether having molecular structure $CH_3O-(CH_2O)_n-CH_3$, with n=1 (OME1); and
IV. reacting OME1 obtained in step III with trioxane obtained in step II to produce OME3-5.

Preferably, OME3-5 are obtained from renewable sources, e.g. by converting renewable methanol to OME3-5, to increase the overall environmental sustainability of the diesel fuel composition and the manufacturing thereof.

According to a third aspect of the invention, there is provided a method for forming a diesel fuel composition according to the first aspect, comprising: mixing a renewable paraffinic diesel component with oxymethylene ethers having molecular structure $CH_3O-(CH_2O)_n-CH_3$, with n=3-5 (OME3-5), to form the diesel fuel composition according to the first aspect.

According to a fourth aspect of the invention, there is provided use of a diesel fuel composition according to the first aspect as a fuel for a diesel engine. Use of the diesel fuel composition of the first aspect as a diesel engine fuel decreases particulate emissions during operation of the engine.

According to a fifth aspect of the invention, there is provided use of oxymethylene ethers having molecular structure $CH_3O-(CH_2O)_n-CH_3$, with n=3-5 (OME3-5), to decrease particulate emission of a renewable diesel fuel, wherein OME3-5 is added to the renewable diesel fuel to form a combined diesel fuel composition comprising 5-80 vol-% OME3-5 of the total combined diesel fuel composition volume. Combined diesel fuel compositions according to the fifth aspect have beneficial particulate emission properties.

In certain embodiments, OME3-5 is added to the renewable diesel fuel to form a combined diesel fuel composition comprising 10-80 vol-% OME3-5 of the total combined diesel fuel composition volume. Adding at least 10 vol-% OME3-5 to renewable diesel fuel provides a combined diesel fuel compositions having particularly beneficial particulate emission properties.

In certain embodiments, OME3-5 is added to the renewable diesel fuel to form a combined diesel fuel composition comprising 10-20 vol-%, preferably 12-20 vol-%, further preferably 13-20 vol-%, and more preferably 15-20 vol-% OME3-5 of the total combined diesel fuel composition volume. Adding OME3-5 to renewable diesel fuel in these amounts results in combined diesel fuel compositions having particularly beneficial particulate emission properties and a density meeting density requirement of standard EN 590:2017 for automotive diesel fuel, particularly of EN 590:2017 Class 0 to Class 2 fuels.

In certain embodiments, OME3-5 is added to the renewable diesel fuel to form a combined diesel fuel composition comprising 16-20 vol-%, preferably 17-20 vol-%, further preferably 18-20 vol-%, and more preferably 19-20 vol-% OME3-5 of the total combined diesel fuel composition volume. Adding OME3-5 to renewable diesel fuel in such amounts results in combined diesel fuel compositions having very beneficial particulate emission properties and a density meeting density requirements of EN 590:2017.

According to a sixth aspect of the invention, there is provided a method for decreasing particulate emissions of a renewable diesel fuel, the method comprising: adding OME3-5 to the renewable diesel fuel to form a combined diesel fuel composition comprising 5-80 vol-% OME3-5 of the total combined diesel fuel composition volume.

In certain embodiments, the method comprises adding OME3-5 to the renewable diesel fuel to form a combined diesel fuel composition comprising 10-80 vol-% OME3-5 of the total combined diesel fuel composition volume.

In certain embodiments, the method comprises adding OME3-5 to the renewable diesel fuel to form a combined diesel fuel composition comprising 10-20 vol-%, preferably 12-20 vol-%, further preferably 13-20 vol-%, and more preferably 15-20 vol-% OME3-5 of the total combined diesel fuel composition volume. Adding OME3-5 to renewable diesel in these amounts results in diesel fuel compositions having particularly beneficial particulate emission properties and a density meeting density requirement of standard EN 590:2017 for diesel fuel, particularly of EN 590:2017 Class 0 to Class 2 fuels.

In certain embodiments, the method comprises adding OME3-5 to the renewable diesel fuel to form a combined diesel fuel composition comprising 16-20 vol-%, preferably 17-20 vol-%, further preferably 18-20 vol-%, and more preferably 19-20 vol-% OME3-5 of the total combined diesel fuel composition volume. Adding OME3-5 to renewable diesel in such amounts results in combined diesel fuel compositions having very beneficial particulate emission properties and a density meeting density requirements of EN 590:2017.

Different non-binding aspects and embodiments of the present invention have been illustrated in the foregoing. The embodiments in the foregoing are used merely to explain selected aspects or steps that may be utilized in implementations of the present invention. Some embodiments may be presented only with reference to certain aspects of the invention. It should be appreciated that corresponding embodiments may apply to other aspects as well.

BRIEF DESCRIPTION OF THE DRAWINGS

Some example embodiments of the invention will be described with reference to the accompanying drawings, in which.

DETAILED DESCRIPTION

The present invention provides a diesel fuel composition, comprising a renewable paraffinic diesel component and oxymethylene ethers having molecular structure $CH_3O-(CH_2O)_n-CH_3$, with n=3-5 (OME3-5), the diesel fuel composition having beneficial particulate emission properties. Beneficial particulate emission properties means herein a low or decreased particulate mass (PM) emission value, and/or a low or decreased particulate number (PN) emission value. For example, beneficial particulate emission properties may be PN emission below $2 \cdot 10^6$ cm$^{-3}$ (measured according to ISO8178-1:2006) and PM emission below 20 mg/kWh. Beneficial particulate emission properties may in certain embodiments also refer to a decrease in PM emissions and/or PN emissions compared to fossil diesel according to standard EN 590:2017 for diesel fuels. Decreasing particulate emissions improve air quality, reduce potential health risks and lengthen the regeneration interval of particulate filters.

The diesel fuel composition of the present invention comprises a renewable paraffinic diesel component in an amount of 20-95 vol-% of the total diesel fuel composition volume, and oxymethylene ethers having molecular structure $CH_3O-(CH_2O)_n-CH_3$, with n=3-5 (OME3-5), in an amount of 5-80 vol-% of the total diesel fuel composition volume. It has surprisingly been found, that diesel fuel compositions comprising renewable paraffinic diesel component 20-95 vol-% and OME3-5 5-80 vol-% of the total diesel fuel composition volume have beneficial particulate emission properties when combusted in diesel engines.

In certain embodiments, the diesel fuel composition comprises 10-20 vol-% OME3-5 and 80-90 vol-% renewable paraffinic diesel component, preferably 12-20 vol-% OME3-5 and 80-88 vol-% renewable paraffinic diesel component, further preferably 13-20 vol-% OME3-5 and 80-87 vol-% renewable paraffinic diesel component, and more preferably 15-20 vol-% OME3-5 and 80-85 vol-% renewable paraffinic diesel component of the total diesel fuel composition volume. Diesel fuel compositions according to these embodiments have been found to have particularly beneficial particulate emission properties and a density meeting density requirements of EN 590:2017 for automotive diesel fuel, particularly of EN 590:2017 Class 0 to Class 2 fuels (800-845 kg/m$^3$ at 15° C. and measured according to EN ISO 3675 or EN ISO 12185).

In certain embodiments, the diesel fuel composition comprises 16-20 vol-% OME3-5 and 80-84 vol-% renewable paraffinic diesel component, preferably 17-20 vol-% OME3-5 and 80-83 vol-% renewable paraffinic diesel component, further preferably 18-20 vol-% OME3-5 and 80-82 vol-% renewable paraffinic diesel component, and more preferably 19-20 vol-% OME3-5 and 80-81 vol-% renewable paraffinic diesel component of the total diesel fuel composition volume. Such diesel fuel compositions have very beneficial particulate emission properties and meet density requirements of EN 590:2017. In certain preferred embodiments, the diesel fuel composition comprises about 20 vol-% OME3-5 of the total diesel fuel composition volume, the combined amount of the OME3-5 and the renewable paraffinic diesel component being at least 95 vol-%, preferably at least 97 vol-%, more preferably at least 99 vol-% of the total diesel fuel composition volume. Diesel fuel compositions of the present invention comprising approximately 20 vol-% OME3-5 have in addition to very beneficial particulate emission properties a density in the range 820-845 kg/m$^3$ (at 15° C. and measured according to EN ISO 3675 or EN ISO 12185), and thus meet the density requirements of EN 590:2017 for most fuel classes of the standard.

Diesel fuel compositions comprising mainly renewable paraffinic diesel component and OME3-5 are preferred. Such diesel fuel compositions perform well as automotive diesel fuels and have particularly beneficial particulate emission properties. These effects are further favored as the combined amount of the renewable paraffinic diesel component and OME3-5 in the diesel fuel composition increases. Without being bound to any theory, this is believed to be due to a beneficial C/H ratio of the diesel fuel composition and the lack of C—C bonds in OME3-5. Therefore, in any of the embodiments disclosed herein, the combined amount of the renewable paraffinic diesel component and OME3-5 may be at least 95 vol-%, preferably at least 97 vol-%, and more preferably at least 99 vol-% of the total diesel fuel composition volume.

Accordingly, in certain embodiments, the diesel fuel composition comprises 5-80 vol-% OME3-5 and 20-95 vol-% renewable paraffinic diesel component of the total diesel fuel composition volume, the combined amount of the renewable paraffinic diesel component and OME3-5 in the diesel fuel composition being at least 95 vol-%, preferably at least 97 vol-%, more preferably at least 99 vol-% of the total diesel fuel composition volume.

Further, in certain embodiments, the diesel fuel composition comprises OME3-5 10-20 vol-%, preferably 12-20 vol-%, further preferably 13-20 vol-%, and more preferably 15-20 vol-% of the total diesel fuel composition volume, the combined amount of the renewable paraffinic diesel component and OME3-5 in the diesel fuel composition being at least 95 vol-% of the total diesel fuel composition volume. Further, in certain embodiments, the diesel fuel composition comprises OME3-5 10-20 vol-%, preferably 12-20 vol-%, further preferably 13-20 vol-%, and more preferably 15-20 vol-% of the total diesel fuel composition volume, the combined amount of the renewable paraffinic diesel component and OME3-5 in the diesel fuel composition being at least 97 vol-% of the total diesel fuel composition volume. In certain embodiments, the diesel fuel composition comprises OME3-5 10-20 vol-%, preferably 12-20 vol-%, further preferably 13-20 vol-%, and more preferably 15-20 vol-% of the total diesel fuel composition volume, the combined amount of the renewable paraffinic diesel component and OME3-5 in the diesel fuel composition being at least 99 vol-%, of the total diesel fuel composition volume.

Yet further, in certain embodiments, the diesel fuel composition comprises 16-20 vol-% OME3-5, preferably 17-20 vol-% OME3-5, further preferably 18-20 vol-% OME3-5, and more preferably 19-20 vol-% OME3-5 of the total diesel fuel composition volume, the combined amount of OME3-5 and the renewable diesel component in the diesel fuel composition being at least 95 vol-% of the total diesel fuel composition.

In addition to the renewable paraffinic diesel component and OME3-5, the diesel fuel composition of the present invention may comprise diesel fuel additives known in the art, preferably less than 5 vol-%, or less than 3 vol-%, or less than 1 vol-% of the total diesel fuel composition volume. Such diesel fuel additives are for example lubricity improvers and/or cold flow additives. Diesel fuel additives may be provided to the diesel fuel composition to enhance certain properties, such as lubricity, stability, or cetane number.

The renewable paraffinic diesel component comprised in the diesel fuel composition of the present invention is a component derived from a renewable source or renewable sources and comprising to a large extent paraffins (alkanes), and is suitable for use as diesel engine fuel as such, or, for example, after additization with known diesel fuel additives, such as a lubricity improver. Preferably, the renewable paraffinic diesel component is suitable for use as a fuel for automotive diesel engines. The renewable paraffinic diesel component may also be referred to as "bio-based paraffinic diesel component", "hydrotreated vegetable oil fuel", "hydrotreated vegetable oil", "hydrotreated renewable diesel", "renewable fuel", "renewable diesel", "renewable diesel component", or "gas-to-liquid (GTL) fuel". In certain embodiments, the renewable paraffinic diesel component is a renewable paraffinic diesel fuel fulfilling the requirements of standard EN15940:2016 for automotive paraffinic diesel fuel from synthesis or hydrotreatment.

Components or compositions derived from renewable (bio-based) sources have a higher content of $^{14}C$ isotopes than corresponding components or compositions derived from fossil (fossil based) sources. Said higher content of $^{14}C$ isotopes is an inherent feature of renewable components or compositions owing to the starting material, i.e. the renewable sources, from which they are derived. Carbon atoms of renewable origin comprise a higher number of $^{14}C$ isotopes compared to carbon atoms of fossil origin. The isotope ratio of renewable carbon does not change in the course of chemical reactions. It is thus possible to distinguish between a carbon compound or composition derived from renewable sources and carbon compounds derived from fossil sources by analysing the ratio of $^{12}C$ and $^{14}C$ isotopes. The $^{14}C$ isotope content of a compound or composition can be measured and quantified by standard methods, such as ASTM D 6866 or DIN 51637. Typically, in a component or composition derived completely from renewable sources the measured $^{14}C$ content of the total carbon content in the component or composition is at least 100% (±measurement accuracy). The amount of renewable carbon in the composition can thus be quantified based on the $^{14}C$ isotope profile, and be used to determine the nature and origin of its components. The nature and origin of diesel components and diesel fuels can thus be confirmed and distinguished by $^{14}C$ analysis.

In certain embodiments, the renewable paraffinic diesel component is a renewable paraffinic diesel fuel. The renewable paraffinic diesel component is preferably derived from renewable sources via hydrotreatment optionally followed by an isomerization treatment. The renewable paraffinic diesel component is thus preferably a paraffinic diesel fuel from hydrotreatment. Preferably, the renewable sources from which the renewable paraffinic diesel component is derived are renewable oils, renewable fats, or a combination thereof. Chemically hydrotreated renewable oils and/or fats are mixtures of mainly linear paraffinic hydrocarbons (normal paraffins, n-paraffins) comprising a very low quantity of sulfur and aromatics. Renewable paraffinic diesel components obtained from hydrotreatment followed by isomerization can be used as the renewable paraffinic diesel component or as renewable paraffinic diesel fuel in any aspect and embodiment of the present invention. The renewable paraffinic diesel component consists substantially of organic material.

Hydrotreatment and optional isomerization of renewable oils and/or fats typically produces bio-based middle distillate fuels. In certain embodiments, the renewable paraffinic diesel component is a renewable middle distillate fuel having a boiling point range (initial boiling point to end point) as measured according to EN-ISO-3405 (2011) within the temperature range 180-360° C., preferably 180-320° C. These renewable middle distillate fuel fractions perform particularly well as diesel fuels.

In certain embodiments, the renewable paraffinic diesel component comprises at least 90 wt-%, preferably at least 95 wt-%, more preferably at least 99 wt-% paraffins of the total weight of the renewable paraffinic diesel component. The renewable paraffinic diesel component may comprise at least 91 wt-%, 92 wt-%, 93 wt-%, 94 wt-%, 96 wt-%, 97 wt-%, or 98 wt-% paraffins based on the total weight of the renewable paraffinic diesel component. A high paraffin content favors beneficial particulate emission properties. Without being bound to any theory, this is believed to be due to the lack of double bonds and cyclic hydrocarbons in paraffins. In certain embodiments, the renewable paraffinic diesel component has a low olefin (alkene) content and comprises less than 2.0 wt-%, preferably at most 1.0 wt-%, and more preferably at most 0.5 wt-% olefins of the total weight of the renewable paraffinic diesel component. Further, in certain preferred embodiments, the renewable paraffinic diesel component has a low content of naphthenes (cycloalkanes) and comprises at most 5.0 wt-%, preferably at most 2.0 wt-% naphthenes of the total weight of the renewable paraffinic diesel component.

Preferably, the renewable paraffinic diesel component has a low content, or is free from, aromatic compounds (aromatics). Diesel components with a low content of aromatics (or free from aromatics) burn cleaner compared to components comprising more aromatic compounds thus reducing particulate emissions. Accordingly, in certain embodiments, the renewable paraffinic diesel component comprises at most 1.1 wt-%, preferably at most 0.5 wt-%, more preferably at most 0.2 wt-% aromatics of the total weight of the renewable paraffinic diesel component. Preferably, the renewable paraffinic diesel component is a low-sulfur diesel component comprising sulfur less than 5 ppm by weigh (parts per million by weight), or less than 5 mg sulfur/kg renewable paraffinic diesel component. Low sulfur diesel components burn cleaner compared to components with a higher sulfur content, thus reducing particulate emissions. In certain embodiments, the renewable paraffinic diesel component comprises less than 5 mg sulfur/kg renewable paraffinic diesel component (5 ppm by weight) and at most 1.0 wt-%, preferably at most 0.5 wt-%, more preferably at most 0.2 wt-% aromatics of the total weight of the renewable paraffinic diesel component. Renewable paraffinic diesel components with a low content of both aromatics and sulfur burn particularly cleanly favoring beneficial particulate emission properties. Blending renewable paraffinic diesel component having a low content of aromatics and/or sulfur with OME3-5 results in a diesel fuel composition with a low content, or free from, aromatics and/or sulfur, the diesel fuel composition thus having the associated benefits.

In certain embodiments, the renewable paraffinic diesel component comprises at least 95 wt-% paraffins, at most 1.0 wt-% olefins, at most 0.5 wt-% aromatics, and at most 2.0 wt-% naphthenes based on the total weight of the renewable paraffinic diesel component. Further, in certain embodiments, the renewable paraffinic diesel component comprises at least 99 wt-% paraffins, and at most 0.2 wt-% aromatics based on of the total weight of the renewable paraffinic diesel component, and at most 5 ppm by weight sulfur. Such renewable paraffinic diesel components perform particularly well as diesel fuel components and favour beneficial particulate emission properties. The renewable paraffinic diesel component comprises preferably mainly hydrocarbons, and accordingly, in certain embodiments, the renewable paraffinic diesel component contains at most 1 wt-% oxygen based on all elements constituting the renewable paraffinic diesel component as determined by elemental analysis. Such renewable diesel fuel components have beneficial oxidation stability and storage properties.

In certain embodiments, the renewable paraffinic diesel component comprises at least 70 wt-%, preferably at least 80 wt-%, such as at least 88 wt-%, more preferably at least 90 wt-% paraffins in the range of carbon number C15-C18 of the total weight of the paraffins in the renewable paraffinic diesel component. Optionally, in certain embodiments, the renewable paraffinic diesel component comprises paraffins in the range of carbon number C3-C14 less than 25 wt-%, such as less than 20 wt-%, or less than 10 wt-%, or preferable less than 7 wt-% of the total weight of paraffins in the renewable paraffinic diesel component. Optionally, in certain embodiments, the renewable paraffinic diesel component comprises paraffins in the range of carbon number C19-C24 less than 25 wt-%, such as less than 20 wt-%, or less than 10 wt-%, preferably less than 5 wt-% of the total weight of paraffins in the renewable paraffinic diesel component. These carbon number distributions are typical for renewable paraffinic diesel components derived through hydrotreatment of renewable oils and/or fats.

In certain embodiments, the renewable paraffinic diesel component comprises or consists of gas-to-liquid (GTL) fuel derived from renewable sources. GTL fuels are produced from gaseous components, for example, through the Fischer-Tropsch process. Fuel components manufactured through a gas-to-liquid (GTL) process have a much broader distribution of paraffinic hydrocarbons (paraffins) compared to the above-described carbon number distributions of fuel components manufactured through hydrotreatment of renewable oils and/or fats. GTL-fuels are characterized by broad distribution of paraffinic hydrocarbons in the range C9-C24. Accordingly, in certain embodiments, the renewable paraffinic diesel component comprises at least 90 wt-%, preferably at least 95 wt-%, paraffins in the range of carbon number C9-C24 of the total weight of the paraffins in the renewable paraffinic diesel component.

In certain embodiments, the renewable paraffinic diesel component comprises at least 95 wt-% paraffins of the total weight of the renewable paraffinic diesel component, and at least 70 wt-%, preferably at least 80 wt-%, more preferably at least 90 wt-%, of said paraffins are in the range of carbon number C15-C18 based on the total weight of paraffins in the renewable paraffinic diesel component. Further, in certain embodiments, the renewable paraffinic diesel component comprises at least 99 wt-% paraffins of the total weight of the renewable paraffinic diesel component, and at least 70 wt-%, preferably at least 80 wt-%, more preferably at least 90 wt-%, of said paraffins are in the range of carbon number C15-C18 based on the total weight of paraffins in the renewable paraffinic diesel component. Such renewable paraffinic diesel components have predictable properties, high cetane number (beneficial ignition properties), high paraffin content favoring beneficial particulate emission properties, and perform well as diesel fuel components.

In certain embodiments, the paraffins of the renewable paraffinic diesel component comprise both isoparaffins (i-paraffins) and normal paraffins (n-paraffins). Isoparaffins improve the cold properties, i.e. lower the cloud point or the pour point, of the renewable paraffinic diesel component and consequently of the diesel fuel composition. A weight ratio of i-paraffins to n-paraffins in the renewable paraffinic diesel component of at least 2.2 yields a renewable paraffinic diesel component having a pour point below 0° C. (as measured according to ASTM D5950-14). Accordingly, in certain embodiments, the weight ratio of i-paraffins to n-paraffins in the renewable paraffinic diesel component is at least 2.2. Increasing the weight ratio of i-paraffins to n-paraffins further improves the cold properties of the renewable paraffinic diesel component. In certain embodiments, the weight ratio of i-paraffins to n-paraffins in the renewable paraffinic diesel component is at least 2.3, at least 3, or at least 4. The weight ratio of i-paraffins to n-paraffins in the renewable paraffinic diesel component may be about 2.2, 2.3, 2.4, 2.5, 2.6, 10 2.7, 2.8, 2.9, 3, 4, 5, 6, 7, 8, 9 or 10. A renewable paraffinic diesel component comprising both n-paraffins and i-paraffins can be used in any aspect and embodiment of the present invention. In certain embodiments, the renewable paraffinic diesel component comprises at least 95 wt-% paraffins of the total weight of the renewable paraffinic diesel component, the weight ratio of i-paraffins to n-paraffins of said paraffins being at least 2.3, at least 3, or at least 4. Further, in certain embodiments, the renewable paraffinic diesel component comprises at least 99 wt-% paraffins of the total weight of the renewable paraffinic diesel component, the weight ratio of i-paraffins to n-paraffins of said paraffins being at least 2.3, at least 3, or at least 4.

In certain embodiments, the renewable paraffinic diesel component comprises at least 90 wt-%, preferably at least 95 wt-%, more preferably at least 99 wt-% paraffins of the total weight of the renewable paraffinic diesel component, and of said paraffins at least 80 wt-%, based on the total weight paraffins in the renewable paraffinic diesel component, are in the in the range of carbon number C15-C18, and the weight ratio of i-paraffins to n-paraffins in the renewable paraffinic diesel component is at least 2.2. Further, in certain embodiments, the renewable paraffinic diesel component comprises at least 90 wt-%, preferably at least 95 wt-%, more preferably at least 99 wt-% paraffins, and of said paraffins, based on the total weight of paraffins in the renewable paraffinic diesel component, at least 90 wt-% are in the in the range of carbon number C15-C18, and the weight ratio of i-paraffins to n-paraffins in the renewable paraffinic diesel component is at least 2.2. Such renewable paraffinic diesel components have predictable properties, good cold properties, high paraffin content favoring beneficial particulate emission properties, and perform well as diesel fuel components.

In certain embodiments, the renewable paraffinic diesel component comprises at most 0.2 wt-% aromatics and at least 90 wt-%, preferably at least 95 wt-%, more preferably at least 99 wt-% paraffins of the total weight of the renewable paraffinic diesel component, and of said paraffins, based on the total weight of paraffins in the renewable paraffinic diesel component, at least 90 wt-% are in the in the range of carbon number C15-C18, and the weight ratio of i-paraffins to n-paraffins in the renewable paraffinic diesel component is at least 2.2, the renewable paraffinic diesel component further comprising less than comprises less than 5 ppm by weight sulfur. Such renewable paraffinic diesel components have predictable properties, good cold properties, high paraffin content and low contents of aromatics and sulfur favoring beneficial particulate emission properties, and perform well as diesel fuel components.

The herein described renewable paraffinic diesel component may be provided as the renewable paraffinic diesel component or renewable paraffinic diesel fuel in any aspect and embodiment of the present invention. For example, in certain embodiments, the diesel fuel composition comprises 5-80 vol-% OME3-5 and 20-95 vol-% renewable paraffinic diesel component of the total diesel fuel composition volume, the combined amount of OME3-5 and the renewable paraffinic diesel component preferably being at least 95 vol-% of the total diesel fuel composition volume, and wherein the renewable paraffinic diesel component comprises at least 90 wt-% paraffins of the total weight of the renewable paraffinic diesel component, of said paraffins of the renewable paraffinic diesel component at least 70 wt-%, based on the total weight of paraffins in the renewable paraffinic diesel component, are in the range of carbon numbers C15-C18, the weight ratio of i-paraffins to n-paraffins in the renewable paraffinic diesel component being at least 2.2. Further, in certain embodiments, the diesel fuel composition comprises 10-20 vol-% OME3-5 and 80-90 vol-% renewable paraffinic diesel component, preferably 12-20 vol-% OME3-5 and 80-88 vol-% renewable paraffinic diesel component, further preferably 13-20 vol-% OME3-5 and 80-87 vol-% renewable paraffinic diesel component, and more preferably 15-20 vol-% OME3-5 and 85-80 vol-% renewable paraffinic diesel component of the total diesel fuel composition volume, the combined amount of OME3-5 and the renewable paraffinic diesel component preferably being at least 97 vol-% of the total diesel fuel composition volume, and wherein the renewable paraffinic diesel component comprises at least 95 wt-% paraffins of the renewable paraffinic diesel component, of said paraffins of the renewable paraffinic diesel component at least 80 wt-%, based on the total weight of paraffins in the renewable paraffinic diesel component, are in the range of carbon numbers C15-C18, the weight ratio of i-paraffins to n-paraffins in the renewable paraffinic diesel component being at least 2.2. Further, in certain embodiments, the diesel fuel composition comprises 10-20 vol-% OME3-5 and 80-90 vol-% renewable paraffinic diesel component, preferably 12-20 vol-% OME3-5 and 80-88 vol-% renewable paraffinic diesel component, further preferably 13-20 vol-% OME3-5 and 80-87 vol-% renewable paraffinic diesel component, and more preferably 15-20 vol-% OME3-5 and 85-80 vol-% renewable paraffinic diesel component of the total diesel fuel composition volume, the combined amount of OME3-5 and the renewable paraffinic diesel component preferably being at least 99 vol-% of the total diesel fuel composition volume, and wherein the renewable paraffinic diesel component comprises at least 99 wt-% paraffins of the renewable paraffinic diesel component, of said paraffins of the renewable paraffinic diesel component at least 90 wt-%, based on the total weight of paraffins in the renewable paraffinic diesel component, are in the range of carbon numbers C15-C18, the weight ratio of i-paraffins to n-paraffins in the renewable paraffinic diesel component being at least 2.2. These diesel fuel compositions are particularly preferred.

Yet further, in certain embodiments, the diesel fuel composition comprises 16-20 vol-%, preferably 17-20 vol-%, further preferably 18-20 vol-%, and more preferably 19-20 vol-% OME3-5 of the total diesel fuel composition volume, the combined amount of OME3-5 and the renewable paraffinic diesel component being at least 95 vol-% of the total diesel fuel composition volume, and wherein the renewable paraffinic diesel component comprises at least 97 wt-% paraffins of the renewable paraffinic diesel component, of said paraffins of the renewable paraffinic diesel component at least 80 wt-%, based on the total weight of paraffins in the renewable paraffinic diesel component, are in the range of carbon numbers C15-C18, the weight ratio of i-paraffins to n-paraffins in the renewable paraffinic diesel component being at least 2.2. Yet further, in certain embodiments, the diesel fuel composition comprises 16-20 vol-%, preferably 17-20 vol-%, further preferably 18-20 vol-%, and more preferably 19-20 vol-% OME3-5 of the total diesel fuel composition volume, the combined amount of OME3-5 and the renewable paraffinic diesel component preferably being at least 99 vol-% of the total diesel fuel composition volume, and wherein the renewable paraffinic diesel component comprises at least 99 wt-% paraffins of the renewable paraffinic diesel component, of said paraffins of the renewable paraffinic diesel component at least 90 wt-%, based on the total weight of paraffins in the renewable paraffinic diesel component, are in the range of carbon numbers C15-C18, the weight ratio of i-paraffins to n-paraffins in the renewable paraffinic diesel component being at least 2.2. These diesel fuel compositions are particularly preferred.

The present invention provides a method for producing a diesel fuel composition, the method comprising: providing a renewable paraffinic diesel component; providing oxymethylene ethers having molecular structure $CH_3O—(CH_2O)_n—CH_3$, with n=3-5 (OME3-5); and mixing the renewable paraffinic diesel component with the OME3-5 to form a diesel fuel composition comprising, based on the total diesel fuel composition volume, 5-80 vol-% OME3-5, and 20-95 vol-% renewable paraffinic diesel component. Diesel fuel compositions manufactured according to this method have beneficial particulate emission properties.

In certain embodiments, the method comprises mixing the renewable paraffinic diesel component with the OME3-5 to form a diesel fuel composition comprising, based on the total diesel fuel composition, 10-20 vol-% OME3-5 and 80-90 vol-% renewable paraffinic diesel component, preferably 12-20 vol-% OME3-5 and 80-88 vol-% renewable paraffinic diesel component, further preferably 13-20 vol-% OME3-5 and 80-87 vol-% renewable paraffinic diesel component, and more preferably 15-20 vol-% OME3-5 and 80-85 vol-% renewable paraffinic diesel component of the total diesel fuel composition volume. Diesel fuel compositions formed according to these embodiments have particularly beneficial particulate emission properties and a density meeting density requirement of EN 590:2017 for automotive diesel fuel, particularly of EN 590:2017 Class 0 to Class 2 fuels. In certain embodiments, the method comprises mixing the renewable paraffinic diesel component with the OME3-5 to form a diesel fuel composition comprising 16-20 vol-% OME3-5 and 80-84 vol-% renewable paraffinic diesel component, preferably 17-20 vol-% OME3-5 and 80-83 vol-% renewable paraffinic diesel component, further preferably 18-20 vol-% OME3-5 and 80-82 vol-% renewable paraffinic diesel component, and more preferably 19-20 vol-% OME3-5 and 80-81 vol-% renewable paraffinic diesel component of the total diesel fuel composition volume. Diesel fuel compositions produced according to these embodiments have very beneficial particulate emission properties and a density meeting density requirements of EN 590:2017.

In certain embodiments, providing a renewable paraffinic diesel component comprises providing a feedstock originating from renewable sources (renewable feedstock), the feedstock comprising fatty acids, or fatty acid derivatives, or mono-, di- or triglycerides, or a combination thereof, subjecting said renewable feedstock to hydrotreatment to produce n-paraffins, and optionally subjecting at least a portion of the n-paraffins from the hydrotreatment step to an isomerization treatment to produce i-paraffins. Renewable paraffinic diesel components provided through hydrotreatment and optional isomerization of renewable feedstock are particularly suitable for blending with OME3-5 to form diesel fuel compositions having beneficial particulate emission properties. Subjecting at least a portion of the n-paraffins to an isomerization treatment may comprise separating a portion of the n-paraffins from the hydrotreatment step, subjecting said portion to the isomerization treatment to form i-paraffins and optionally, after the isomerization treatment, reunifying the separated portion with the n-paraffins it was separated from. Alternatively, the isomerization step may comprise subjecting all n-paraffins from the hydrotreatment step to an isomerization treatment. In certain embodiments, the hydrotreatment step and the optional isomerization step are conducted in separate reactors, or carried out separately. Optionally, the step of providing the renewable paraffinic diesel component may comprise a purification step(s) and/or a fractionation step(s). Purification and/or fractionation steps allows better control of the properties of the renewable paraffinic diesel component, and thus of the properties of the diesel fuel composition. In certain embodiments, providing the renewable paraffinic diesel component does not comprise gasifying renewable feedstock.

In certain embodiments, the hydrotreatment is performed at a pressure selected from, or varying within, the range 2-15 MPa, preferably 3-10 MPa, and at a temperature selected from, or varying within, the range 200-500° C., preferably 280-400° C. The hydrotreatment may be performed in the presence of known hydrotreatment catalysts containing metals from Group VIII and/or VIB of the Periodic System. Preferably, the hydrotreatment catalysts are supported Pd, Pt, Ni, NiW, NiMo or a CoMo catalyst, wherein the support is alumina and/or silica. Typically, $NiMo/Al_2O_3$ and/or $CoMo/Al_2O_3$ catalysts are used. Preferably, the hydrotreatment is hydrodeoxygenation (HDO), or catalytic hydrodeoxygenation (catalytic HDO).

The hydrotreatment typically serves as a deoxygenation, denitrogenation, and desulfurization treatment of the fatty acids, fatty acid derivatives, and/or the glycerides comprised in the renewable feedstock. Further, providing the renewable paraffinic diesel component may comprise subjecting the renewable feedstock to decarboxylation and decarbonylation reactions (i.e. removal of oxygen in the form of CON), and/or other catalytic processes to: remove oxygen from organic oxygen compounds in the form of water, to remove sulfur from organic sulfur compounds in the form of dihydrogen sulfide ($H_2S$), to remove nitrogen from organic nitrogen compounds in the form of ammonia ($NH_3$) and to remove halogens from organic halogen compounds, for example chlorine in the form of hydrochloric acid (HCl). Such processes may be for example hydrodechlorination to remove chlorine and hydrodenitrogenation (HDN) to remove nitrogen.

In certain embodiments, n-paraffins from the hydrotreatment step may be subjected to catalytic cracking (CC), the catalytic cracking step then optionally followed by the isomerization treatment. CC allows adjusting the chain length of the paraffins. Typically, the carbon number distribution does not substantially change during the optional isomerization treatment. Therefore, in certain embodiments, the amount of paraffins in the carbon number range C3-C14 does not substantially increase during the optional isomerization treatment. Hence, the carbon number distribution of paraffins in the renewable paraffinic diesel component can be controlled.

In certain embodiments, providing the renewable paraffinic diesel component comprises subjecting at least a portion of the n-paraffins from the hydrotreatment step to the isomerization treatment to form i-paraffins. The isomerization treatment may be a catalytic isomerization treatment, such as hydroisomerization. Subjecting at least a portion of the renewable feedstock to the isomerization treatment increases the amount of isoparaffins in the (provided) renewable paraffinic diesel component. Typically, n-paraffins from the hydrotreatment step subjected to the isomerization treatment form i-paraffins having predominantly methyl branches. Accordingly, in certain embodiments, the i-paraffins from the isomerization step comprise one or more methyl branches. The severity of the isomerization conditions and the choice of catalyst controls the amount of methyl branches formed in the treatment and their distance from each other.

In certain embodiments, the isomerization treatment is performed at a temperature selected from, or varying within, the range 200-500° C., preferably 280-400° C., and at a pressure selected from, or varying within, the range 2-15 MPa, preferably 3-10 MPa. The isomerization treatment may be performed in the presence of known isomerization catalysts, for example catalysts containing a molecular sieve and/or a metal selected from Group VIII of the Periodic Table and a carrier. Preferably, the isomerization catalyst is a catalyst containing SAPO-11 or SAPO-41 or ZSM-22 or ZSM-23 or ferrierite and Pt, Pd, or Ni and Al2O3 or SiO2. Typical Pt/SAPO-11/Al2O3, Pt/ZSM-22/Al2O3, Pt/ZSM-23/Al2O3 and/or Pt/SAPO-11/SiO2 are used as catalyst in the isomerization step (isomerization treatment). In certain embodiments, the hydrotreatment catalyst(s) and the isomerization catalyst(s) are not in contact with the reaction feed (the renewable feedstock and/or n-paraffins and/or i-paraffins derived therefrom) at the same time.

In certain embodiments, the renewable feedstock (renewable source(s) from which the renewable paraffinic diesel component is derived) comprises vegetable oil, or wood oil, or other plant based oil, or animal oil, or animal fat, or fish fat, or fish oil, or algae oil, or microbial oil, or a combination thereof. Optionally or additionally, the renewable feedstock may also comprise recyclable waste and/or recyclable residue. Recyclable waste comprises material such as used cooking oil, free fatty acids, palm oil by-products or process side streams, sludge, and side streams from vegetable oil processing. Preferably, the renewable feedstock comprises at least one of vegetable oil, vegetable fat, animal oil, and animal fat. These materials are preferred, since they allow providing a renewable feedstock having a predictable composition which can be adjusted as needed by appropriate selection and optional blending of the natural oil(s) and/or fat(s). Further, renewable feedstock comprising recyclable waste, or recyclable residues, or both, is preferred, since recyclable waste and/or recyclable residues improve the overall sustainability of the renewable feedstock and consequently also of the paraffinic diesel component. Optionally, recyclable waste and/or recyclable residues may be combined with fresh feed of renewable oils and/or renewable fats, such as vegetable oil, vegetable fat, animal oil, and/or animal fat. Fresh feed refers herein to components that have not been recycled.

Typically, OME3-5 are derived or converted from methanol. Methanol may be obtained from fossil or renewable sources. Various processes to obtain methanol are known in the art. Preferably however, methanol used in the OME3-5 production is obtained from renewable sources to increase the overall environmental sustainability of the diesel fuel composition and the manufacturing thereof. Methanol is typically obtained by reacting $CO_2$ (and/or CO) with $H_2$, preferably in the presence of a catalyst. Preferably, the $CO_2$ used as an OME3-5 starting material originates from renewable sources, such as biomass gasification products, and/or biogas. For example, $CO_2$ originating from steel or power plant waste or side streams may be used to synthesize methanol. Producing methanol from waste streams or side streams of industrial processes saves resources and may decrease $CO_2$ emissions. Diesel fuel compositions of a renewable paraffinic diesel component derived from recyclable waste and/or recyclable residue and of OME3-5 derived from renewable methanol obtained from $CO_2$ recycled from waste streams or side streams of industrial processes helps to control greenhouse gases. Preferably, to further increase the environmental sustainability, $H_2$ used as an OME3-5 starting material originates from renewable sources. For example, said $H_2$ may be obtained from water through electrolysis. The electrolysis process may be powered by non-fossil electricity, such as by wind power or solar power.

OME3-5 can be derived from methanol trough different pathways. For example, methanol can be converted to formaldehyde, formaldehyde converted to trioxane, then methanol can be reacted with formaldehyde to form oxymethylene ether having molecular structure $CH_3O—(CH_2O)_n—CH_3$, wherein=1 (OME1) or dimethoxymethane (DME), followed by reacting OME1 or DME with trioxane to form OME3-5. If the methanol used as starting material originates from renewable sources then the resulting OME3-5 is also renewable. Renewable OME3-5 may be used in any aspect or embodiment of the present invention.

Accordingly, in certain embodiments, providing OME3-5 comprises providing methanol originating from renewable sources, converting a portion of said methanol to formaldehyde and another portion of said methanol to trioxane, reacting unconverted methanol with formaldehyde obtained in the conversion step to form oxymethylene ether having molecular structure $CH_3O—(CH_2O)_n—CH_3$, with n=1 (OME1), and reacting the OME1 obtained in the previous step with trioxane obtained in the conversion step to produce OME3-5. Preferably, OME3-5 are obtained from renewable sources to increase the overall environmental sustainability of the diesel fuel composition and the manufacturing thereof. However, optionally, OME may be derived from fossil sources. Preferably, OME3-5 are separated from the reaction mixture for example by distillation.

The formaldehyde may be provided as an aqueous formaldehyde solution. Typically, paraformaldehyde (p-formaldehyde) is formed in aqueous formaldehyde solutions, particularly at cold temperatures. Accordingly, the formaldehyde may comprise or consists of p-formaldehyde.

Alternatively, OME3-5 are formed directly by reacting methanol with p-formaldehyde or with a concentrated formaldehyde solution, after which OME3-5 are preferably separated from the reaction mixture, for example, by distillation. In certain embodiments, OME3-5 are derived by reacting methanol with p-formaldehyde in the presence of a catalyst, such as an Amberlyst® catalyst.

Alternatively, OME3-5 may be formed by reacting OME1 or DME with water free formaldehyde, preferably followed by separation of OME3-5 from the reaction mixture.

Oxymethylene ethers (OME) may sometimes be referred to as "oxymethylen dimethyl ethers", "oligomeric oxymethylene dimethyl ethers", or "polyoxymethylene dimethyl ethers".

In certain embodiments, the OME3-5 comprises 40-50 wt-% OME 3 ($CH_3O—(CH_2O)_n—CH_3$ with n=3), 35-45 wt-% OME4 ($CH_3O—(CH_2O)_n—CH_3$ with n=4) and 5-25 wt-% OME5 ($CH_3O—(CH_2O)_n—CH_3$ with n=5) of the total weight of OME3-5 in the diesel fuel composition. Preferably, OME3-5 comprises ca. 45 wt-% OME 3 ($CH_3O—(CH_2O)_n—CH_3$ with n=3), ca. 40 wt-% OME4 ($CH_3O—(CH_2O)_n—CH_3$ with n=4) and ca. 15 wt-% OME5 ($CH_3O—(CH_2O)_n—CH_3$ with n=5) of the total weight of OME3-5 in the diesel fuel composition. Such distributions of OME3, OME4, and OME5 in OME3-5 promotes beneficial particulate emission properties, and may be provided in any aspect the present invention.

The present invention further provides use of oxymethylene ethers having molecular structure $CH_3O—(CH_2O)_n—CH_3$, with n=3-5 (OME3-5), to decrease particulate emissions of a renewable diesel fuel, wherein OME3-5 is added to the renewable diesel fuel to form a combined diesel fuel composition comprising 5-80 vol-% OME3-5 and 20-95 vol-% renewable diesel of the total combined diesel fuel composition volume.

The present invention also provides a method for decreasing the particulate emissions of a renewable diesel fuel, the method comprising: adding OME3-5 to the renewable diesel fuel to form a combined diesel fuel composition comprising 5-80 vol-% OME3-5 and 20-95 vol-% renewable diesel fuel of the total combined diesel fuel composition volume.

In certain embodiments, OME3-5 is added to the renewable diesel fuel to form a combined diesel fuel composition comprising 10-20 vol-% OME3-5 and 80-90 vol-% renewable diesel, preferably 12-20 vol-% OME3-5 and 80-88 vol-% renewable diesel, further preferably 13-20 vol-% OME3-5 and 80-87 vol-% renewable diesel, and more preferably 15-20 vol-% OME3-5 and 80-85 vol-% renewable diesel of the total combined diesel fuel composition volume. Adding OME3-5 to renewable diesel to form combined diesel fuel compositions comprising OME3-5 and renewable diesel in these amounts yields combined diesel fuel compositions having particularly beneficial particulate emission properties and a density meeting density requirement of standard EN 590:2017 for automotive diesel fuel, particularly of EN 590:2017 Class 0 to Class 2 fuels.

In certain embodiments, OME3-5 is added to the renewable diesel fuel to form a combined diesel fuel composition comprising 16-20 vol-% OME3-5 and 80-84 vol-% renewable diesel, preferably 17-20 vol-% OME3-5 and 80-83 vol-% renewable diesel, further preferably 18-20 vol-% OME3-5 and 80-82 vol-% renewable diesel, and more preferably 19-20 vol-% OME3-5 and 80-81 vol-% renewable diesel of the total combined diesel fuel composition volume. In certain embodiments, OME3-5 is added to the renewable diesel fuel to form a combined diesel fuel composition comprising 16-20 vol-%, preferably 17-20 vol-%, further preferably 18-20 vol-%, and more preferably 19-20 vol-% OME3-5 of the total combined diesel fuel composition volume, the combined amount of the OME3-5 and renewable diesel being at least 95 vol-% of the combined diesel fuel composition volume. Adding OME3-5 to renewable diesel in such amounts results in combined diesel fuel compositions having very beneficial particulate emission properties and a density meeting density requirements of EN 590:2017. Preferably, OME3-5 is added to the diesel fuel composition to form a combined diesel fuel composition comprising about 20 vol-% OME3-5 of the total combined diesel fuel composition volume, the combined amount of the OME3-5 and the renewable paraffinic diesel component being at least 95 vol-%, preferably at least 97 vol-%, more preferably at least 99 vol-% of the total combined diesel fuel composition volume. Adding OME3-5 to form combined diesel fuel composition with approximately 20 vol-% OME3-5 have very beneficial particulate emission properties and a density in the range 820-845 kg/m$^3$ (at 15° C.) meeting the density requirements of EN 590:2017 for most fuel classes of the standard.

OME 3-5 may be added to the renewable diesel to form a combined diesel fuel composition in which the combined amount of OME3-5 and renewable diesel is at least 95 vol-%, preferably at least 97 vol-%, more preferably at least 99 vol-% of the total combined diesel fuel composition volume. Adding OME3-5 to renewable diesel to form combined diesel fuel compositions with a high combined amount of OME3-5 and renewable diesel results in combined diesel fuel compositions that perform well as automotive diesel fuels and have particularly beneficial particulate emission properties. These effects are further favored as the combined amount of the renewable paraffinic diesel component and OME3-5 in the combined diesel fuel composition increases. In certain embodiments, the combined diesel fuel composition consists essentially of OME3-5 and renewable diesel. Preferably, in any of the embodiments described herein, the renewable diesel to which OME3-5 is added is renewable paraffinic diesel fuel. An example of a renewable paraffinic diesel fuel is the renewable paraffinic diesel component described herein.

EXAMPLES

The following examples are provided to better illustrate the claimed invention and are not to be interpreted as limiting the scope of the invention. To the extent that specific materials are mentioned, it is merely for purposes of illustration and is not intended to limit the invention.

Table 1. presents various oxymethylene ethers (OME) and their properties. The number in the OME-column of Table 1 is the value of n in the molecular formula of OME, namely $CH_3O-(CH_2O)_n-CH_3$. Dimethylether (DME), having molecular formula $CH_3O-CH_3$, is related to OME and sometimes referred to as OME0, i.e. $CH_3O-(CH_2O)_n-CH_3$, wherein n=0.

TABLE 1

Properties of various OME.

| OME | Polyoxy methylene-DME | Chemical formula | Molecular weight (g/mol) | Density at 15° C. [kg/dm3] | Melting point [° C.] | Boiling point [° C.] | Flash point [° C.] | Cetane number |
|---|---|---|---|---|---|---|---|---|
| 0 | Dimethylether [DME] | C2H6O | 46.07 | 0.66 | −141 | −24 | | 55/60 |
| 1 | Monooxy methylene-DME | C3H8O2 | 76.1 | 0.87 | −105 | 42 | −18 | 38 |
| 2 | Dioxy methylene-DME | C4H10O3 | 105.1 | 0.97 | −70 | 105 | 12 | 94 |
| 3 | Trioxy methylene-DME | C5H12O4 | 134.2 | 1.03 | −44 | 155 | 54 | 124 |
| 4 | Tetraoxy methylene-DME | C6H14O5 | 163.2 | 1.07 | −11 | 190 | 88 | 148 |
| 5 | Pentaoxymethylene-DME | C7H16O6 | 192.2 | 1.1 | 18 | 242 | 115 | 180 |

Of the compounds in Table 1, OME 3-5 were identified as most promising diesel fuel components mainly due to their high cetane numbers and reasonably high boiling points. Accordingly, OME3-5 were selected to be studied as blending components for renewable diesel. A renewable paraffinic diesel fuel fulfilling the requirements of standard EN15940:2016 for automotive paraffinic diesel fuel from synthesis or hydrotreatment (referred also to as renewable diesel (RD) in the following), was used as the renewable diesel blending component.

Neither neat OME3-5 nor neat renewable diesel meet the density requirements of EN 590:2017. Further, neat OME3-5 does not fulfill density requirements of EN EN15940:2016. The densities of OME3-5 are shown in Table 1. Typically, neat renewable diesel has a density of approximately 780 kg/m$^3$ at 15° C. The density requirement for EN 590:2017 Class 0 to Class 2 diesel fuels is 800-845 kg/m$^3$ (at 15° C. and measured according to EN ISO 3675 or EN ISO 12185). A density within the range 820-845 kg/m³ (at 15° C. and measured according to EN ISO 3675 or EN ISO 12185) meets the requirements set for most fuel classes of EN590:2017.

Densities of blends of the renewable diesel and OME3, OME4, or OME5 at different vol-% were calculated and are shown in Table 2. As seen in Table 2, diesel fuel compositions of renewable diesel and 10-20 vol-% OME3, OME4, or OME5 had densities in the range 800-845 kg/m³ (at 15° C.). Diesel fuel compositions of renewable diesel and 20 vol-% OME3, OME4, or OME5 had a density in the range 820-845 kg/m³ (at 15° C.). However, diesel fuel compositions comprising 30 vol-% OME3, OME4, or OME5 had densities exceeding 845 kg/m³ (at 15° C.).

TABLE 2

Calculated density values of blends of OME3, OME4, or OME5 and renewable diesel (RD). The density values of Table 2 are given in kg/m³ (at 15° C.).

| OME | 10 vol-% OME + 90 vol-% RD | 20 vol-% OME + 80 vol-% RD | 30 vol-% OME + 70 vol-% RD |
|---|---|---|---|
| OME3 | 805 | 830 | 855 |
| OME4 | 809 | 838 | 867 |
| OME5 | 812 | 844 | 876 |

Engine Tests

Three diesel fuel compositions were prepared for engine tests to study particulate emissions of diesel fuel compositions. A fossil EN 590:2017 winter grade diesel fuel was used as a reference fuel in the engine tests. Table 3 presents the properties of the studied diesel fuel compositions, of their components, and of the reference fuel.

TABLE 3

Properties of diesel fuel compositions studied in the engine tests, of OME3-5, of renewable diesel (RD), and of the reference fuel (EN590).

| | Fuel 1 OME3-5 | Fuel 2 RD | Fuel 3 EN590 | Fuel 4 7 vol-% OME3-5 + 93 vol-% RD | Fuel 5 15 vol-% OME3-5 + 85 vol-% RD | Fuel 6 7 vol-% OME3-5 + 93 vol-% EN590 |
|---|---|---|---|---|---|---|
| Density at 15° C. (kg/m3) | 1067.6 | 779.8 | 818.9 | 796.5 | 812.4 | 833.8 |
| Viscosity (mm2/s) | 1.194 | 2.919 | 1.843 | 2.56 | 2.239 | 1.715 |
| Lower heating value (MJ/kg) | n.d. | 43.82 | 43.078 | 41.495 | 39.603 | 40.926 |
| Oxidation stability (min) | 46 | 120.6 | 93.5 | 100.06 | 82.52 | 92.98 |
| Carbon content (wt %) | n.d. | 84.8 | 86.1 | 81.9 | 78.8 | 83.5 |
| Hydrogen content (wt %) | n.d. | 15.2 | 13.9 | 14.7 | 14.1 | 13.6 |
| Distillation IBP (° C.) | 157 | 209.9 | 166.9 | 169 | 162.5 | 164.2 |

TABLE 3-continued

Properties of diesel fuel compositions studied in the engine tests, of OME3-5, of renewable diesel (RD), and of the reference fuel (EN590).

| | Fuel 1 OME3-5 | Fuel 2 RD | Fuel 3 EN590 | Fuel 4 7 vol-% OME3-5 + 93 vol-% RD | Fuel 5 15 vol-% OME3-5 + 85 vol-% RD | Fuel 6 7 vol-% OME3-5 + 93 vol-% EN590 |
|---|---|---|---|---|---|---|
| DIS 05 (° C.) | 164.5 | 251 | 189.1 | 206.2 | 183.5 | 180.4 |
| DIS 10 (° C.) | 166.8 | 261.1 | 195.1 | 234.1 | 199.8 | 186.9 |
| DIS 20 (° C.) | 169.4 | 269.6 | 203.8 | 261.4 | 252.8 | 198.2 |
| DIS 30 (° C.) | 172.4 | 272.9 | 212.2 | 270 | 268.4 | 208.2 |
| DIS 40 (° C.) | 176.1 | 275.4 | 221.5 | 274.1 | 263 | 217.1 |
| DIS 50 (° C.) | 181.2 | 277.4 | 230 | 276.6 | 274.6 | 226.8 |
| DIS 60 (° C.) | 190 | 279.4 | 240.4 | 278.9 | 277.7 | 236.6 |
| DIS 70 (° C.) | 201.7 | 281.7 | 252.2 | 281.5 | 280.4 | 250 |
| DIS 80 (° C.) | 214.2 | 284.8 | 267.1 | 284.7 | 283.9 | 265 |
| DIS 90 (° C.) | 232.3 | 289 | 288 | 289.1 | 288.7 | 285.9 |
| DIS 95 (° C.) | 247.2 | 293.2 | 305.1 | 293.4 | 293.5 | 303.5 |
| FBP (° C.) | 259.2 | 301.9 | 320.3 | 303.4 | 301.1 | 318.7 |

Engine tests were performed with a single cylinder test engine. The single cylinder test engine was a single cylinder test engine with free valve lift and timing, and with fully adjustable injection parameters. Charge and exhaust pressure were also adjustable. Particulate emissions of Fuels 3-6 were measured in the engine tests.

A test matrix with measuring points having different speed and loads was designed. The measuring points of said matrix are shown in Table 4 together with corresponding test parameters.

TABLE 4

The measuring points and parameters thereof.

| Test point | Charge air pressure (bar(g)) | Charge air temperature (° C.) | Charge air backpressure (bar(g)) | Injection timing (° bTDC) | Injection pressure (bar) |
|---|---|---|---|---|---|
| 1700 rpm 50% load | 0.52 | 28 | 0.71 | 9 | 1399 |
| 1700 rpm 70% load | 1.34 | 28 | 1.71 | 12 | 1400 |
| 1300 rpm 65% load | 0.46 | 28 | 0.53 | 7 | 1200 |
| 1300 rpm 80% load | 0.94 | 28 | 0.95 | 8 | 1200 |

Three diesel fuel compositions (Fuels 4-6 of Table 3) and a reference fuel (Fuel 3 of Table 3) were studied at the measuring points of Table 4. As shown in Table 3, Fuels 4 and 5 were blends of OME3-5 and renewable diesel, whereas Fuel 6 was a blend of OME3-5 and the reference fuel, i.e. fossil EN590 winter grade diesel. The particulate emissions were studied at each measuring point.

Particulate mass (PM) emission measurements were performed according to ISO8178-1:2006. The PM measurements were performed with an AVL SPC472 Smart Sampler.

Samples were taken from raw exhaust gas, the samples then diluted with a dilution factor of 1:6 sample to dilution air. The sampling time varied from 90 to 600 seconds, depending on particulate concentration and pressure drop of the sample filter. The samples were collected on 47 mm TX40HI20-WW Pallflex filters. The filter flow was set to 1.3 g/s (60 ml/min) and the filter temperature was kept between 42-50° C. From each measuring point 2-3 filters were collected. Sample filters were weighed, before and after the collection of the diluted exhaustion gas samples on the filters, in a climatic room in which the temperature and humidity were controlled. The filters were stabilized for at least 2 hours before weighing them. The flow calibration of the AVL SPC472 Smart Sampler was checked daily and adjusted if needed. During this PM measurement campaign, the need for adjustments was negligible. The reference fuel was measured before and after measuring the PM emission of Fuels 4-6.

Particulate number (PN) emission was measured with an Electrical Low Pressure Impactor (ELPI) manufactured by Dekati. Samples were taken from raw exhaust gas and diluted in two stages with ejector diluters. The dilution ratio of both ejectors was ca. 1:8 sample to dilution air, and the overall dilution ratio was 1:67.8 sample to dilution air. The primary diluter was heated to 450° C. and dilution air of the first dilution stage was heated to 300° C. The secondary diluter and dilution air of the second dilution stage were both at room temperature.

Figure 1:
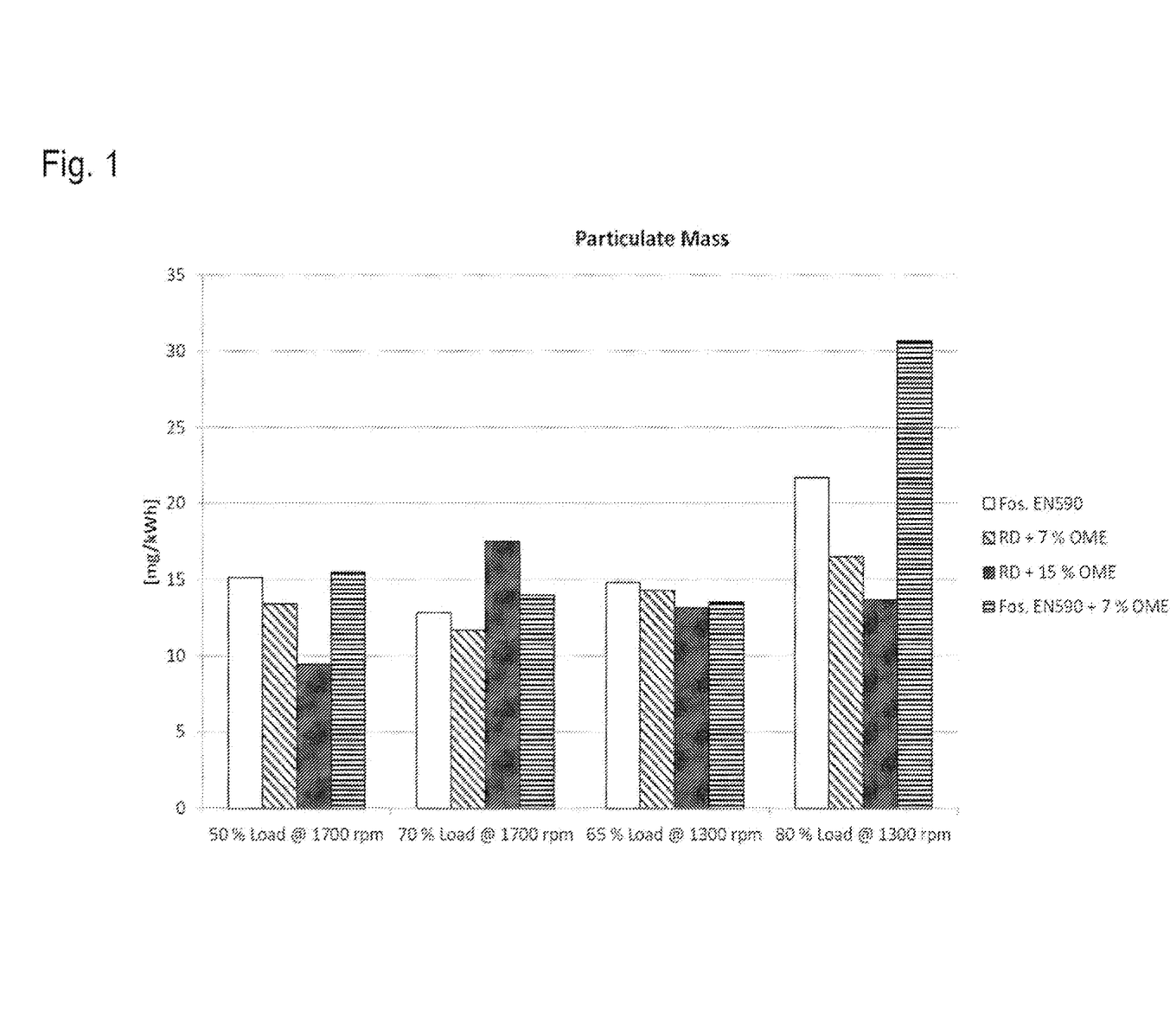
FIG. 1 shows a bar chart presenting particulate mass (PM) emission values (mg/kWh) of four diesel fuel compositions measured at four load points. The solid white bars denote reference Fuel 3, which is EN590 fossil diesel, the diagonally striped bars denote Fuel 4, comprising 7 vol-% OME3-5 and 93 vol-% renewable diesel, the solid black bars denote Fuel 5, comprising 15 vol-% OME3-5 and 85 vol-% renewable diesel, and the horizontally striped bars denote Fuel 6, comprising 7 vol-% OME3-5 and 93 vol-% EN590 fossil diesel.
Figure 2:
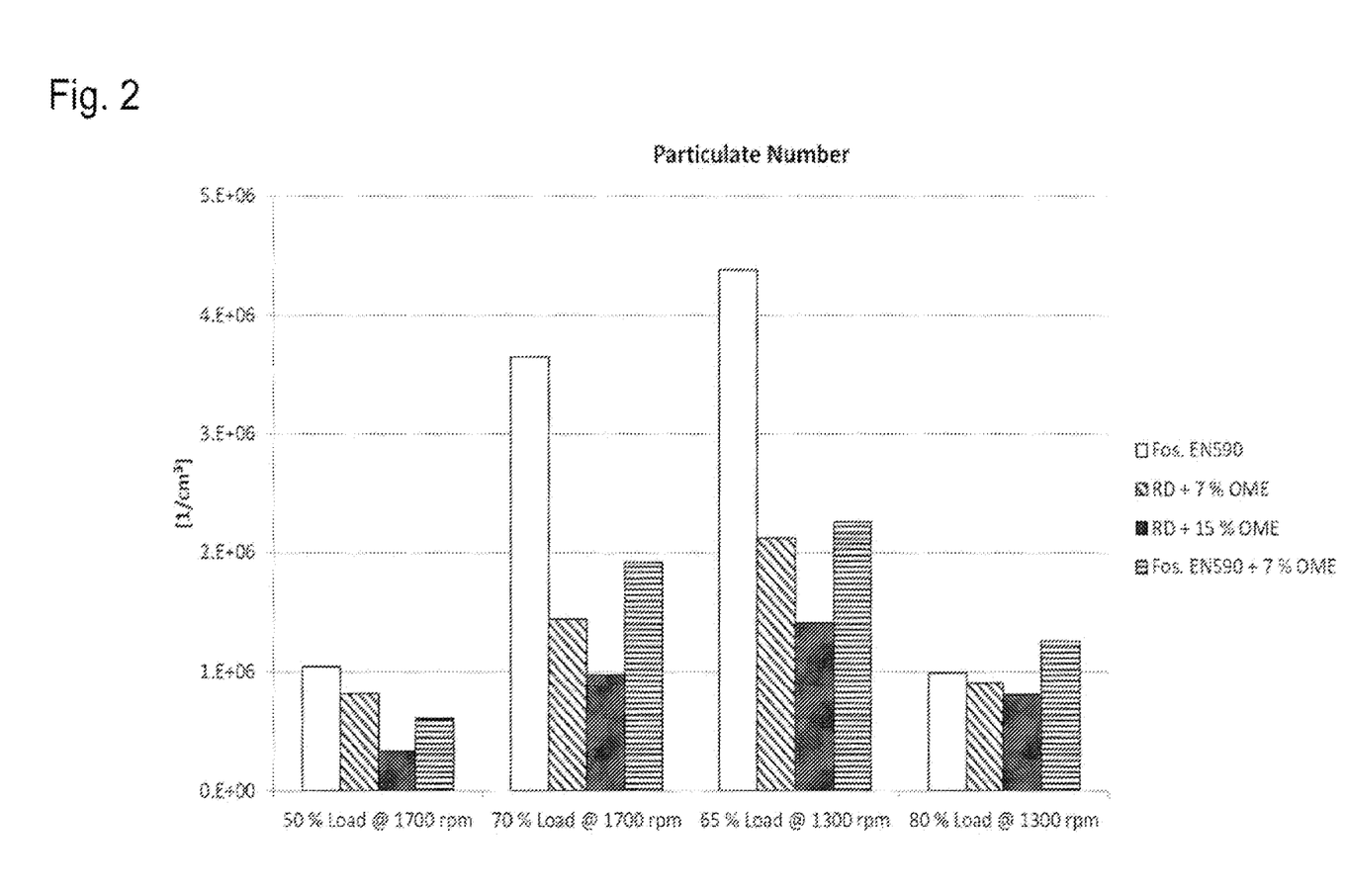
FIG. 2 shows a bar chart presenting particulate number (PN) emission values (1/cm$^3$) of four diesel fuels measured at four load points. The solid white bars denote reference Fuel 3, which is EN590 fossil diesel, the diagonally striped bars denote Fuel 4, comprising 7 vol-% OME3-5 and 93 vol-% renewable diesel, the solid black bars denote Fuel 5, comprising 15 vol-% OME3-5 and 85 vol-% renewable diesel, and the horizontally striped bars denote Fuel 6, comprising 7 vol-% OME3-5 and 93 vol-% EN590 fossil diesel.
Figure 3:
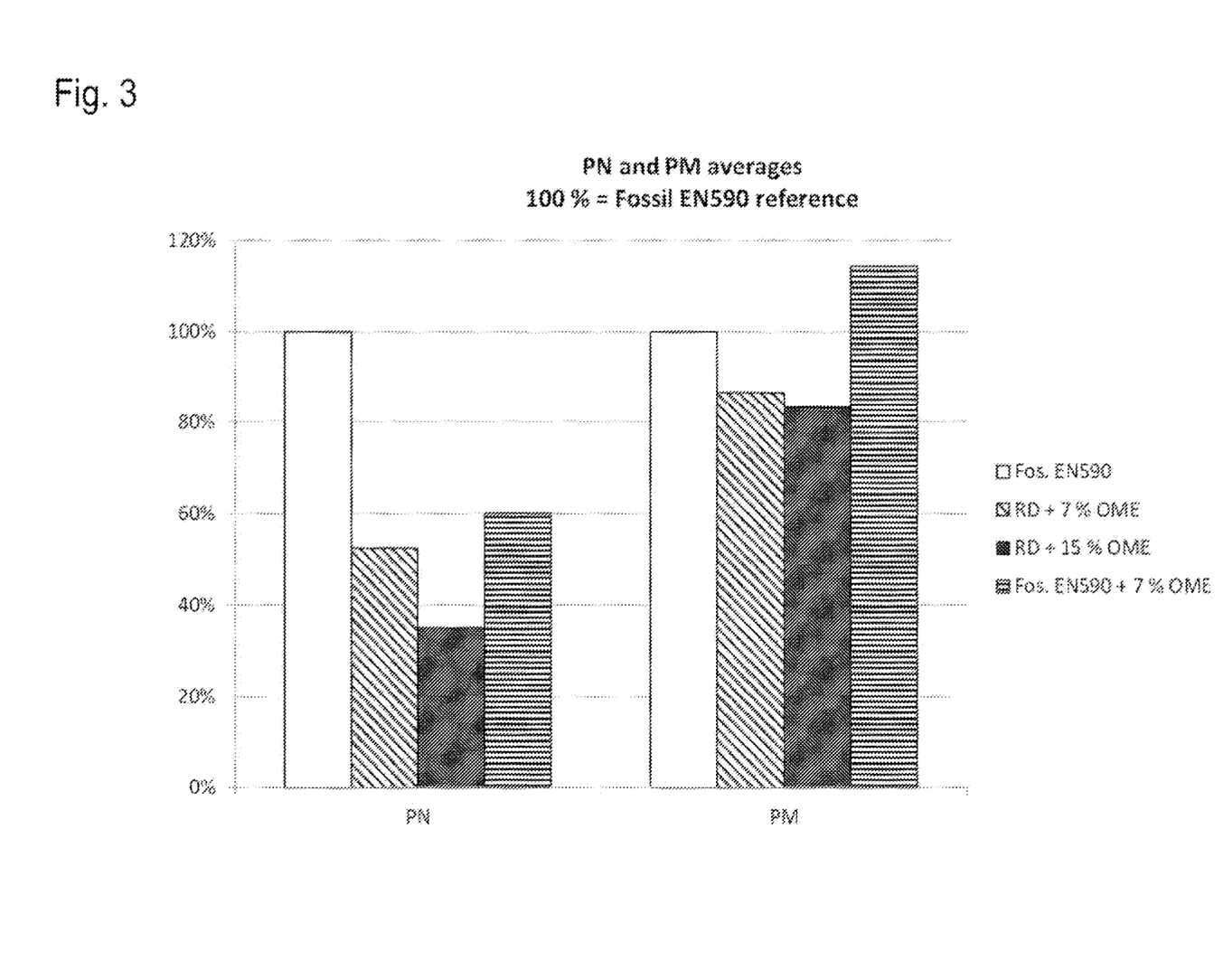
FIG. 3 shows the average of PN and PM values respectively of four fuels calculated from the PN and PM values measured at four different load points. The average PN and the average PM are normalized with regard to Fuel 3, so that the average PM and PN values of Fuel 3 represent 100% and the PM and PN averages of Fuels 4-6 are plotted relative to that 100%. The solid white bars denote Fuel 3, which is EN590 fossil diesel, the diagonally striped bars denote Fuel 4, comprising 7 vol-% OME3-5 and 93 vol-% renewable diesel, the solid black bars denote Fuel 5, comprising 15 vol-% OME3-5 and 85 vol-% renewable diesel, and the horizontally striped bars denote Fuel 6, comprising 7 vol-% OME3-5 and 93 vol-% EN590 fossil diesel.

The results of the PM and PN measurements are shown in FIG. 1 and FIG. 2, respectively. FIG. 3 shows the average PN and PM for each fuel calculated from the PN and PM values measured at the different measuring points (test points). In FIGS. 1-3, the solid white bars denote particulate emissions of reference fuel Fuel 3, the diagonally striped bars denote particulate emissions of Fuel 4, the solid black bars denote particulate emissions of Fuel 5, and the horizontally striped bars denote particulate emissions of Fuel 6. The average PM and PN values of FIG. 3 are normalized in view of the reference fuel Fuel 3, so that the average PM and PN values of Fuel 3 represent 100% PN and PM respectively, and the PM and PN averages of Fuels 4-6 are plotted relative to that 100%.

As can be seen from the average PM and PN values shown in FIG. 3, the composition of the fuel impacts the particulate emissions. Blending OME3-5 with renewable diesel (Fuels 4 and 5) resulted in fuel compositions having more beneficial particulate emission properties than when blending OME3-5 with EN 590 fossil diesel (Fuel 6). Blending OME3-5 with renewable diesel decreased the average PN emissions by over 45%. Fuel 4 had a PN average of almost 50% less than the reference (Fuel 3), and Fuel 5 had a PN average of 65% less than the reference (Fuel 3), whereas Fuel 6 had a PN average of merely 40% less than the reference (Fuel 3). Surprisingly, blending OME3-5 with EN 590 fossil diesel resulted in a PM average of almost 15% more (PM average of Fuel 6) compared to the PM average of the reference Fuel 3. In other words, blending EN 590 fossil diesel with OME3-5 deteriorated the PM emission average compared to neat EN 590 fossil diesel. Contrary, blending OME3-5 with the renewable diesel decreased the PM average compared to the reference. Fuel 5 had a particularly beneficial PM average of over 15% less than the reference (Fuel3). Based on the PN and PM emission averages, Fuel 5 was found to have a composition resulting in particularly beneficial particulate emission properties. Without being bound to any theory, it is believed that the beneficial particulate emission properties of Fuel 5 is a synergistical effect of the blend comprising the renewable diesel substantially lacking unsaturated hydrocarbons and cyclic hydrocarbons and having very low aromatic content (or lack of aromatics) and a sufficient amount of OME3-5, which lack C—C-bonds. Particularly, as seen in FIGS. 2 and 3, the PN emissions of Fuel 5 were decreased compared to Fuels 3, 4, and 6. Further, Fuel 5, as shown in Table 3, had a density of 812.4 kg/m$^3$, which is well within the range 800-845 kg/m$^3$. Hence, fuel 5 provides a diesel fuel composition with particularly beneficial particulate emission properties while meeting density requirements of EN590: 2017.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A diesel fuel composition comprising:
   a. a renewable paraffinic diesel component 20-95 vol-% of a total diesel fuel composition volume, the renewable paraffinic diesel component containing i-paraffins and n-paraffins in a weight ratio of i-paraffins to n-paraffins of at least 2.2, and paraffins in a range of carbon number C15-C18 at least 70 wt-% of a total weight of paraffins in the renewable paraffinic diesel component; and
   b. oxymethylene ethers having molecular structure $CH_3O—(CH_2O)n-CH_3$, with n=3-5 (OME3-5), 5-80 vol-% of the total diesel fuel composition volume.

2. The diesel fuel composition according to claim 1, comprising:
   OME3-5 10-80 vol-% of the total diesel fuel composition volume.

3. The diesel fuel composition according to claim 1, comprising:
   OME3-5 10-20 vol-% of the total diesel fuel composition volume.

4. The diesel fuel composition according to claim 1, comprising:
   OME3-5 12-20 vol-% of the total diesel fuel composition volume.

5. The diesel fuel composition according to claim 1, comprising:
   renewable paraffinic diesel component 20-90 vol-% of the total diesel fuel composition volume.

6. The diesel fuel composition according to claim 1, comprising:
   renewable paraffinic diesel component 80-90 vol-% of the total diesel fuel composition volume.

7. The diesel fuel composition according to claim 1, comprising:
   renewable paraffinic diesel component 80-88 vol-% of the total diesel fuel composition volume.

8. The diesel fuel composition according to claim 1, wherein a combined amount of a. and b. in the diesel fuel composition is at least 95 vol-% of the total diesel fuel composition volume.

9. The diesel fuel composition according to claim 1, wherein a combined amount of a. and b. in the diesel fuel composition is at least 97 vol-% of the total diesel fuel composition volume.

10. The diesel fuel composition according to claim 1, wherein a renewable paraffinic diesel component comprises:
paraffins at least 90 wt-% of a total weight of the renewable paraffinic diesel component.

11. The diesel fuel composition according to claim 1, wherein the renewable paraffinic diesel component comprises:
paraffins at least 95 wt-% of a total weight of the renewable paraffinic diesel component.

12. The diesel fuel composition according to claim 1, wherein the renewable paraffinic diesel component comprises:
paraffins in a range of carbon number C15-C18 at least 80 wt-% of the total weight of paraffins in the renewable paraffinic diesel component.

13. The diesel fuel composition according to claim 1, wherein the renewable paraffinic diesel component comprises:
paraffins in a range of carbon number C15-C18 at least 90 wt-% of the total weight of paraffins in the renewable paraffinic diesel component.

14. The diesel fuel composition according to claim 1, wherein the renewable paraffinic diesel component comprises:
i-paraffins and n-paraffins in a weight ratio of i-paraffins to n-paraffins of at least 2.3, at least 3 or at least 4.

15. The diesel fuel composition according to claim 1, wherein the OME3-5 comprises:
40-50 wt-% OME3 (n=3), 35-45 wt-% OME4 (n=4) and 5-25 wt-% OME5 (n=5) of a total weight of OME3-5 in the diesel fuel composition.

16. A method for producing a diesel fuel composition, comprising:
providing a renewable paraffinic diesel component, produced by:
i. providing a renewable feedstock containing fatty acids, or triglycerides, or both;
ii. subjecting the renewable feedstock to a hydrotreatment, to produce n-paraffins; and
iii. subjecting at least a portion of the n-paraffins from step ii) to an isomerization treatment to produce i-paraffins;
providing oxymethylene ethers having molecular structure $CH_3O-(CH_2O)n-CH_3$, with n=3-5 (OME3-5); and
mixing the renewable paraffinic diesel component with the OME3-5 to form a diesel fuel composition containing, based on a total diesel fuel composition volume, 5-80 vol-% OME3-5, and 20-95 vol-% renewable paraffinic diesel component.

17. A method for decreasing particulate emission of a renewable diesel fuel using oxymethylene ethers having molecular structure $CH_3O-(CH_2O)n-CH_3$, with n=3-5 (OME3-5), the method comprising:
providing a renewable diesel fuel containing i-paraffins and n-paraffins in a weight ratio of i-paraffins to n-paraffins of at least 2.2, and paraffins in a range of carbon number C15-C18 at least 70 wt-% of a total weight of paraffins in the renewable diesel fuel; and
adding OME3-5 to the renewable diesel fuel to form a combined diesel fuel composition containing 5-80 vol-% OME3-5 of a total combined diesel fuel composition volume.

18. The method according to claim 17, comprising:
adding OME3-5 to the renewable diesel fuel to form a combined diesel fuel composition containing 10-80 vol-% OME3-5 of the total combined diesel fuel composition volume.

19. The method according to claim 17, comprising:
adding OME3-5 to the renewable diesel fuel to form a combined diesel fuel composition containing 10-20 vol-% OME3-5 of the total combined diesel fuel composition volume.

20. The use of claim 17, comprising:
adding OME3-5 to the renewable diesel fuel to form a combined diesel fuel composition containing 12-20 vol-% OME3-5 of the total combined diesel fuel composition volume.

* * * * *